US012767757B2

(12) United States Patent
Tom John et al.

(10) Patent No.: US 12,767,757 B2
(45) Date of Patent: Oct. 20, 2026

(54) PROCESS FOR PRODUCING A POLYESTER COMPRISING 2,5-FURANDICARBOXYLATE UNITS

(71) Applicant: Furanix Technologies B.V., Amsterdam (NL)

(72) Inventors: Uitslag Tom John, Amsterdam (NL); Aberson Rene, Amsterdam (NL)

(73) Assignee: Furanix Technologies B.V., Amsterdam (NL)

( * ) Notice: Subject to any disclaimer, the term of this patent is extended or adjusted under 35 U.S.C. 154(b) by 626 days.

(21) Appl. No.: 18/039,526

(22) PCT Filed: Dec. 21, 2021

(86) PCT No.: PCT/EP2021/086924

§ 371 (c)(1),
(2) Date: May 31, 2023

(87) PCT Pub. No.: WO2022/136332

PCT Pub. Date: Jun. 30, 2022

(65) Prior Publication Data

US 2024/0002592 A1 Jan. 4, 2024

(30) Foreign Application Priority Data

Dec. 23, 2020 (EP) .................................... 20217073

(51) Int. Cl.

| | |
|---|---|
| ***C08G 63/672*** | (2006.01) |
| ***C08G 63/16*** | (2006.01) |
| ***C08G 63/181*** | (2006.01) |
| ***C08G 63/83*** | (2006.01) |
| ***C08G 63/84*** | (2006.01) |

(52) U.S. Cl.

CPC ........... *C08G 63/672* (2013.01); *C08G 63/16* (2013.01); *C08G 63/181* (2013.01); *C08G 63/83* (2013.01); *C08G 63/84* (2013.01)

(58) Field of Classification Search

None

See application file for complete search history.

(56) References Cited

U.S. PATENT DOCUMENTS

| | | | | |
|---|---|---|---|---|
| 4,721,817 | A | 1/1988 | Edwards | |
| 9,284,405 | B2 * | 3/2016 | Lee | C08G 63/199 |
| 2002/0087027 | A1 | 7/2002 | Lindall et al. | |
| 2010/0174044 | A1 | 7/2010 | Eritate | |
| 2014/0357808 | A1 | 12/2014 | Hess et al. | |
| 2016/0319066 | A1 | 11/2016 | Shimoharai et al. | |
| 2017/0015781 | A1 * | 1/2017 | Kolstad | C08G 63/80 |

FOREIGN PATENT DOCUMENTS

| | | | |
|---|---|---|---|
| CN | 105849152 | A | 8/2016 |
| CN | 109648966 | B | 11/2020 |
| EP | 3 085 723 | A1 | 10/2016 |
| EP | 3 116 932 | B1 | 5/2018 |
| EP | 3 116 934 | B1 | 6/2018 |
| JP | 2006274505 | A | 10/2006 |
| WO | 2010/132740 | A2 | 11/2010 |
| WO | 2011/043660 | A2 | 4/2011 |
| WO | 2013/120989 | A2 | 8/2013 |
| WO | 2015/137805 | A1 | 9/2015 |

OTHER PUBLICATIONS

European Patent No. 21 840 036.4, Communication pursuant to Article 94(3) EPC, dated Apr. 26, 2024, 4 pages.

The State Intellectual Property Office of People's Republic of China, Chinese Patent Application No. 202180086094.7, First Office Action, Feb. 2, 2026, 19, pages.

* cited by examiner

*Primary Examiner* — Marc S Zimmer
*Assistant Examiner* — Virginia L Stonehocker
(74) *Attorney, Agent, or Firm* — Hoffmann & Baron, LLP

(57) ABSTRACT

A process for producing a polyester having 2,5-furandicarboxylate units, which process includes: a) providing or producing a starting composition including 2,5-furandicarboxylic acid or a diester thereof and an aliphatic diol, b) subjecting the starting composition to esterification conditions to produce an ester composition, and c) contacting the ester composition with an aluminum containing catalyst and a phosphorous compound at polycondensation conditions to produce a polyester comprising 2,5-furandicarboxylate units, where the phosphorous compound includes one or more compounds of phosphoric acid based compounds that include an aromatic moiety.

10 Claims, No Drawings

PROCESS FOR PRODUCING A POLYESTER COMPRISING 2,5-FURANDICARBOXYLATE UNITS

CROSS-REFERENCE TO RELATED APPLICATIONS

This application is the National Stage of International Application No. PCT/EP2021/086924, filed Dec. 21, 2021, which claims the benefit of European Application No. 20217073.4, filed Dec. 23, 2020, the contents of which is incorporated by reference herein.

FIELD OF THE INVENTION

The present invention relates to a process for producing a polyester comprising 2,5-furandicarboxylate units, a polyester comprising 2,5-furandicarboxylate units, a catalyst system for use in such processes and the use of the respective catalyst system in the production of a polyester comprising 2,5-furandicarboxylate units for increasing the polymerization rate during subsequent solid state polymerization of polyesters comprising 2,5-furandicarboxylate units.

BACKGROUND OF THE INVENTION 2,5-Furandicarboxylic acid (FDCA) is known in the art to be a highly promising bio-based building block for replacing petroleum based monomers in the production of high performance polymers. In recent years FDCA and the corresponding polyester with mono ethylene glycol (PEF) have attracted a lot of attention. PEF is a recyclable plastic with superior performance properties compared to today's widely used plastics. These materials could significantly reduce the dependence on petroleum based polymers and plastics, while at the same time allowing for a more sustainable management of global resources. Correspondingly, comprehensive research was conducted to arrive at a technology for producing FDCA and PEF in a commercially viable way.

FDCA is typically obtained by oxidation of molecules having furan moieties, e.g. 5-hydroxymethylfurfural (5-HMF) and the corresponding 5-HMF esters or 5-HMF ethers, that are typically obtained from plant based sugars, e.g. by sugar dehydration. A broad variety of oxidation processes is known from the prior art, that comprises e.g. enzymatic or metal catalyzed processes such as described in WO2010/132740 and WO2011/043660.

While a substantial research effort was directed at efficient production of the monomer FDCA in the early days of the technology, researchers soon realized that arriving at efficient processes for producing high-performance polyesters from FDCA was at least as challenging. FDCA is oftentimes considered a structural and functional analogue to terephthalic acid (TA) which is used in the production of the widely used polyester polyethylene terephthalate (PET). However, it became apparent that several established techniques known from the PET industry would not produce high-performance polyesters from FDCA. Comprehensive prior art is available on processes for producing polyesters from FDCA focusing on different aspects of the technology, e.g. EP 3116932, EP 3116934, WO 2013/120989 and US 2010/0174044.

Prior art processes of producing polyesters of diacids typically comprise at least two distinct steps, i.e. the esterification and the polycondensation before crystallization and solid state polymerization, wherein some processes also include additional intermediate steps like pre-polycondensation and/or granulation of the obtained resin. During esterification diacids are reacted with diols under esterification conditions. Under these conditions, a part of the free carboxyl groups reacts with a part of the free hydroxyl groups to form an ester bond and water. Therefore, a mixture is produced that—depending on the concentration of the starting materials—comprises monomeric diesters and monoesters of the diacid with the diol, e.g. hydroxyalkyl esters, as well as water, residual free diacid and low molecular oligomers of these compounds.

The composition obtained in the esterification step is subsequently subjected to polycondensation conditions at elevated temperature and reduced pressure in order to obtain the final polyester. The polycondensation is typically conducted in the presence of a polycondensation catalyst that usually is a metal compound.

Optionally, a pre-polycondensation step may be used between the esterification step and the polycondensation step. The pre-polycondensation step is typically conducted at a pressure lower than that use in esterification and can be used to remove the most volatile components, such as free diol and other low molecular weight compounds, before reducing the pressure even further to begin the polycondensation process.

Well known catalyst systems for making polyesters, including processes for PEF production, are those that comprise an antimony compound as the polycondensation catalyst, as disclosed e.g. in WO 2015/137807.

In several cases, it would be beneficial if it would be possible to further increase the molecular weight of polyesters comprising 2,5-furandicarboxylate units obtained after polycondensation for specific end use applications. Therefore, it is known to further process polyesters after polycondensation by crystallization and subsequent solid state polymerization for increasing the average molecular weight of the polyester. It would be beneficial to reduce the solid state polymerization time that is needed to obtain the desired average molecular weight of the polyester. In order to solve this problem, it is desired to provide a process for producing a polyester comprising 2,5-furandicarboxylate units that yields a polyester with an average molecular weight that is high after polycondensation and also yields a polyester that exhibits a good processability, i.e. high rate of polymerization (in average molecular weight gained per time), during subsequent solid state polymerization.

SUMMARY OF THE INVENTION

The primary objective of the present invention therefore was to provide an improved process for producing a polyester comprising 2,5-furandicarboxylate units from 2,5-furandicarboxylic acid, wherein the process is capable of providing polyester comprising 2,5-furandicarboxylate units with high average molecular weight after polycondensation and a high rate of polymerization (in average molecular weight gained per time) during subsequent solid state polymerization.

Due to the envisioned potential of polyester comprising 2,5-furandicarboxylate units to be a more ecologically friendly alternative to petroleum based polyesters, it was a further objective of the present invention to provide a process that can be operated using compounds that are considered more ecologically friendly compared to the prior art and that are considered safe from a health perspective both during handling of the process as well as in the obtained polymer, e.g. as a residue.

As polyesters comprising 2,5-furandicarboxylate are considered promising for several packaging applications for that the customer expects transparent materials, e.g. for bottles, it was an additional objective of the present invention to provide a process that yields polyester with good optical properties after polycondensation and reduces any potential detrimental effect of the solid state polymerization on the optical properties by allowing for shorter solid state polymerization times.

It was a secondary objective of the present invention to provide a polyester comprising 2,5-furandicarboxylate units with improved properties during further processing, in particular with respect to the polymerization rate (in average molecular weight gained per time) during subsequent solid state polymerization.

It was also an objective of the present invention to provide a catalyst system for use in respective processes as well as the use of said catalyst system for increasing the polymerization rate in average molecular weight gained per time during subsequent solid state polymerization of polyester comprising 2,5-furandicarboxylate units.

It now surprisingly has been found that a polyester comprising 2,5-furandicarboxylate units with good average molecular weight after polycondensation and a high polymerization rate (in average molecular weight gained per time) during subsequent solid state polymerization can be obtained, if a specific catalyst system is used during polycondensation, namely aluminum compounds as polycondensation catalyst and a phosphorous compound, wherein the phosphorous compound comprises one or more compounds selected from the group consisting of phosphoric acid based compounds that comprise an aromatic moiety.

EP 3085723 A1 discloses a process for producing (co-) polyesters from a broad variety of dicarboxylic acids and FDCA or its diester, using a catalyst system comprising an aluminum compound and a phosphorous compound which is selected from the group consisting of phosphonic acid-based and phosphinic acid-based compounds.

It now surprisingly has been found that the polymerization rate (in average molecular weight gained per time) during subsequent solid state polymerization can be significantly increased if instead of the phosphonic acid-based or phosphinic acid-based compounds different phosphorous compounds are employed that are selected from the group consisting of phosphoric acid-based compounds that comprise an aromatic moiety. In other words, while EP 3085723 A1 discloses the use of phosphorous compounds that exhibit a C—P connectivity, i.e. a bond between carbon and phosphorous, the inventors surprisingly found that the objective of the present invention can be achieved by using phosphorous compounds that have no direct C—P connection but in that all organic residues are connected to the phosphorous via a C—O—P connection. In particular, it was surprising that the beneficial effect could be obtained by use of a catalyst system that is employed during polycondensation thereby reducing the need for other substances to be added after polycondensation and thereby improving the processability of the resulting polyester.

DETAILED DESCRIPTION OF THE INVENTION

Hereinafter, the subject-matter of the invention is discussed in more detail, wherein preferred embodiments of the invention are disclosed. It is particularly preferred to combine two or more preferred embodiments to obtain an especially preferred embodiment. Correspondingly, especially preferred is a process according to the invention that defines two or more features of preferred embodiments of the present invention.

The present process for producing a polyester comprising 2,5-furandicarboxylate units comprises:

a) providing or producing a starting composition comprising 2,5-furandicarboxylic acid or a diester thereof and an aliphatic diol, b) subjecting the starting composition to esterification conditions to produce an ester composition, and c) contacting the ester composition with an aluminum containing catalyst and a phosphorous compound at polycondensation conditions to produce a polyester comprising 2,5-furandicarboxylate units, wherein the phosphorous compound comprises one or more compounds selected from the group consisting of phosphoric acid based compounds that comprise an aromatic moiety.

The starting composition can be produced or provided, e.g. bought from a separate supplier. The starting composition preferably comprises 2,5-furandicarboxylic acid i.e. the free diacid.

Decarboxylation of FDCA yields 2-furancarboxylic acid which functions as a chain terminator in polycondensation and limits the maximum obtainable molecular weight of the polyester. Therefore, it is especially preferred to carefully limit the concentration of 2-furancarboxylic acid in the starting composition. The starting composition preferably comprises 500 ppm or less of 2-furancarboxylic acid, preferably 400 ppm or less, more preferably 300 ppm or less, by weight with respect to the weight of the starting composition. Likewise, it is preferred to limit the concentration of the monoesters of 2-furandicarboxylic acid in the starting composition. The starting composition preferably comprises 5000 ppm or less of monoester of 2-furandicarboxylic acid, preferably 3000 ppm or less, more preferably 1500 ppm or less, most preferably 1000 ppm or less, by weight with respect to the weight of the starting composition.

The starting composition further comprises an aliphatic diol. The present process is very flexible with respect to the type of aliphatic diol used, without limiting its beneficial effect on the polymerization rate (in average molecular weight gained per time) during subsequent solid state polymerization. In principle, the aliphatic diol can be biobased or fossil based, wherein a biobased aliphatic diol is preferred.

The starting composition optionally also comprises a suppressant for suppressing ether formation between the aliphatic diol molecules. The effect of ether formation is known for a broad variety of aliphatic diols, wherein a suppressant that is a capable of reducing the ether formation for a given diol can safely be assumed to at least reduce the amount of ether formation for other diols as well. Suitable suppressants are known to the skilled person and can e.g. be selected from the group consisting of tetraalkyl ammonium compounds, choline, alkali metal salts of carboxylic acids, alkaline earth metal salts of carboxylic acids, basic alkali metal salts of mineral acids, basic alkaline earth metal salts of mineral acids, alkali metal hydroxides, ammonium hydroxides and combinations thereof.

The starting composition prepared in step a) is subjected to esterification conditions to produce an ester composition. The esterification of a diol compound with an acid compound or diester thereof is a reaction that is well known to the skilled person and that is typically conducted at elevated temperatures. Based on the molar ratio of the starting materials used in the starting composition, the chemical constitution of the ester composition can vary. However, for the molar ratios typically employed, the ester composition is expected to comprise the mono-ester of the diacid with the diol compound, the diester of the diacid with the diol, a minor amount of unreacted FDCA as well as low molecular oligomers of the respective compounds and potentially unreacted aliphatic diol compound.

Preferably, the ester composition comprises 2,5-furandicarboxylic acid units to ethylene glycol units in a ratio in the range of 1:1.01 to 1:1.25.

The ester composition obtained in step b) is afterwards contacted with an aluminum containing catalyst and the phosphorous compound at polycondensation conditions, wherein other intermediate steps can be conducted in between step b) and step c), e.g. a pre-polycondensation step as described above. This polycondensation is used for producing a polyester comprising 2,5-furandicarboxylate units by forming additional ester moieties between the compounds of the ester composition by means of esterification and transesterification, wherein e.g. water and/or aliphatic diol are released in the condensation process, and are typically removed from the reaction due to the elevated temperatures and reduced pressures used during polycondensation.

Both the esterification reaction and the polycondensation may be conducted in one or more steps and could suitably be operated as either batch, semi-continuous or continuous processes. It is preferred that the esterification process is suitably conducted until the esterification reaction has progressed to the point where 80% or more, preferably 85% or more, most preferably 90% or more, of the acid groups have been converted to ester moieties before the polycondensation is started.

For the invention to show its beneficial effect it is important, that the polycondensation is conducted in the presence of an aluminum containing catalyst. As it is the chemical behavior of the metal that is considered to function as a catalyst, the aluminum containing catalyst is in principle not limited to a specific type of compound, allowing for a large flexibility with respect to the choice of the polycondensation catalyst. Furthermore, the polycondensation of the present invention is conducted in the presence of a phosphorous compound, wherein the phosphorous compound comprises one or more compounds selected from the group consisting of phosphoric acid based compounds that comprise an aromatic moiety.

The skilled person understands that the amount of phosphorous compound and polycondensation catalyst may vary within the typical ranges known for catalyst systems and is mostly dependent on the type of compound that is used as well as the amount of FDCA that is employed in the starting material and the molar ratio of aliphatic diol to FDCA. Therefore, the skilled person can determine suitable amounts of these compounds for his specific purposes.

The process of the present invention can produce a polyester comprising 2,5-furandicarboxylate units with good average molecular weight after polycondensation and good processability in subsequent solid state polymerizations, i.e. that exhibit a good increase in molecular weight during solid state polymerization. Furthermore, the process of the present invention allows to prepare polyesters that exhibit good optical properties.

As a beneficial effect, the process of the present invention uses compounds that are considered ecologically friendly.

Preferred is a process according to the invention, wherein the aliphatic diol comprises 2 to 8 carbon atoms, preferably 2 to 6 carbon atoms, wherein the aliphatic diol preferably solely has carbon atoms in the main chain. Preferably, the aliphatic diol comprises no C—O—C connectivity.

Some aliphatic diols contain an ether group, i.e. a C—O—C connectivity in the main chain. For example, DEG is a diol with an internal ether group. While such compounds are sometimes used in the prior art intentionally, the use of respective diols was typically found to give polyesters having less favorable physical-chemical properties. Furthermore, alkylene glycols are typically readily available in large amounts while at the same time being easy to handle and to process. At the same time, the resulting polyesters haven proven to exhibit excellent mechanical properties, in particular if ethylene glycol and/or butylene glycol are used.

Therefore, a process according to the invention is preferred, wherein the polyester comprising 2,5-furandicarboxylate units is a polyalkylenefuranoate, preferably selected from the group consisting of polyethylene-2,5-furandicarboxylate, polypropylene-2,5-furandicarboxylate, polybutylene-2,5-furandicarboxylate, polypentylene-2,5-furandicarboxylate and copolymers comprising 2,5-furandicarboxylate units and units derived from two or more diols selected from the group consisting of ethylene glycol, propylene glycol and butylene glycol. Most preferably the polyester comprising 2,5-furandicarboxylate units contains at least 90% by weight, preferably at least 95% by weight, of units derived from ethylene glycol and 2,5-furandicarboxylic acid.

Preferably, the polyester produced by the present process consists of poly(ethylene 2,5-furandicaboxylate).

Despite the above described advantages of aliphatic diols without internal ether groups, it can be expedient for certain applications to use diols that have an ether moiety. This is particular true for hetero alicyclic compounds, wherein for example isosorbide is known to result in polyesters with promising properties for specific end use applications.

In view of this, a process according to the invention is preferred, wherein the aliphatic diol is selected from the group consisting of acyclic diols and alicyclic diols, preferably selected from the group consisting of alkylene glycols and alicyclic diols, more preferably from the group consisting of alkylene glycols, cyclohexanedimethanol and isosorbide, most preferably alkylene glycols, particular preferred ethylene glycol.

It was discussed in the prior art that the molar ratio of the aliphatic diol to the FDCA can influence the molecular weight obtainable by such a process, and also the velocity of the increase of molecular weight during a subsequent solid state polymerization. For the specific processes of the present invention that are employing an aluminum compound and a specific phosphorous compound, the inventors identified molar ratios that were found to be particular beneficial.

Therefore, preferred is a process according to the invention, wherein the molar ratio of the aliphatic diol to 2,5-furandicarboxylic acid of the starting composition is in the range of 1.01 to 1.80, preferably 1.05 to 1.70, more preferably 1.07 to 1.60, most preferably 1.10 to 1.30, alternatively preferred 1.30 to 2.00, and/or wherein in the ester composition comprises 2,5-furandicarboxylic acid mono-hydroxyalkyl ester of 2,5-furandicarboxylic acid and di-hydroxyalkyl ester of 2,5-furandicarboxylic acid, wherein the total ratio of hydroxyl end groups measured by $^{1}$H-NMR to carboxylic acid end groups measured by titration is in the range of 1.01 to 4.6, preferably 1.05 to 2.00, more preferably 1.07 to 1.80, most preferably 1.10 to 1.30, wherein the amount of hydroxyl end groups measured by $^{1}$H-NMR is preferably in the range of 300 to 2400 eq/t, more preferably 500 to 2000 eq/t, most preferably in the range of 600 to 1800 eq/t, and wherein the amount of carboxylic end groups measured by titration is preferably in the range of 300 to 1200 eq/t, more preferably 500 to 1000 eq/t, most preferably in the range of 600 to 900 eq/t, and/or wherein 2,5-furandicarboxylic acid and aliphatic diols constitute 90% or more, preferably 95% or more, most preferably 98% or more, of the starting composition that is subjected to esterification by weight with respect to the weight of the starting composition.

As indicated above, the inventors invested in identifying optimized conditions for conducting both the esterification and the polycondensation in order to find the best process parameters for the combination with the specific polycondensation catalyst and the phosphorous compound of the process of the present invention, in order to further optimize the processability in subsequent sold state polymerization, yield and quality of the obtainable polyester.

It was found that a process of the present invention is preferred, wherein the esterification is conducted at a temperature in the range of 180 to 260° C., preferably 185 to 240° C., more preferably 190 to 230° C., and/or wherein the polycondensation is conducted at a temperature in the range of 240 to 300° C., preferably 260 to 290° C., more preferably 265 to 285° C.

Preferably, the esterification is conducted at a pressure in the range of 40 to 400 kPA, preferably 50 to 150 kPA, more preferably 60 to 110 kPA, and/or the polycondensation is conducted at reduced pressure in the range of 0.05 to 100 kPA, preferably 0.05 to 10 kPA, more preferably 0.1 to 1 kPA.

The above described preferred process parameters are in particular applicable to those processes, wherein the 2,5-furandicarboxylic acid and the aliphatic diol constitute 90% or more, preferably 95% or more, most preferably 98% or more of the starting composition by weight.

While the actual reaction time depends on the employed starting materials and their amounts, the esterification is typically conducted for a time tin the range of 30 to 480 min, preferably 60 to 360 min, more preferably 120 to 300 min, most preferably 180 to 240 min, while the polycondensation is typically conducted for a time tin the range of 10 to 260 min, preferably 30 to 190 min, more preferably 60 to 120 min.

During the polycondensation step the aliphatic diol, optionally together with water, is released from the oligomers as the latter undergo further polycondensation. It is desirable to remove such aliphatic diol and water, if present, from the reaction in order to prevent the reverse reaction. Aliphatic diols may also lead to further side reactions that tend to be undesirable. For instance, it has been found that ethylene glycol may lead to the formation of acetaldehyde, which has a detrimental effect on the smell and taste of the obtainable polyester.

Preferred is a process of the present invention, wherein water that is formed during the esterification between 2,5-furandicarboxylic acid and aliphatic diol, and part of the aliphatic diol are removed in a distillation system, and wherein aliphatic diol that is removed with water is separated from water and at least partly recycled.

A process according to the invention is especially preferred, wherein the esterification is conducted in the absence of aluminum containing catalyst. The above process is particular preferred, because in some experiments it was observed, that for aluminum containing catalysts the polycondensation catalyst could get deactivated, i.e. somewhat reduced in its effectiveness to catalyze the subsequent polycondensation, if present during the esterification. Thus, a process of the present invention is preferred, wherein the aluminum containing catalyst is added in step c).

From a perspective of process efficiency, it is preferred to add the aluminum containing catalyst and the phosphorous compound together, i.e. during the same process step, either as a mixture or separate, wherein preferably both compounds are added after step b).

The aluminum can be present in the catalyst system as the metal or as the cation. Preferred is a process according to the invention, wherein the aluminum containing catalyst is selected from the group consisting of carboxylic acid salts, preferably aluminum formate, aluminum acetate, aluminum subacetate, aluminum propionate and aluminum oxalate, inorganic aluminum salts, preferably aluminum chloride and aluminum hydroxychloride, aluminum hydroxide, aluminum alkoxides, preferably aluminum methoxide, aluminum ethoxide, aluminum propoxide, aluminum isopropoxide, aluminum n-butoxide and aluminum tert-butoxide, aluminum chelate compounds, preferably aluminum acetylacetonate and aluminum acetylacetate, organoaluminum compounds, preferably trimethylaluminum and triethylaluminum, partial hydrolysates of any of the compounds, aluminum oxide and combinations thereof, wherein the aluminum containing catalyst is preferably selected from the group consisting of aluminum acetylacetonate and aluminum oxide. Most preferably, the aluminum containing catalyst is aluminum acetylacetonate.

As indicated above, the process of the present invention can be flexible with respect to the type of aluminum containing catalyst. However, specific compounds were found to exhibit excellent performance in the process of the present invention. With respect to the aluminum containing catalyst aluminum oxide and aluminum acetylacetonate are preferred due to their performance and resilience to the process parameters typically employed during esterification and/or polycondensation.

With respect to the phosphorous compound, a process of the present invention is preferred, wherein the phosphorous compound comprises one or more compounds selected from the group consisting of phosphoric acid esters and salts of phosphoric acid esters, wherein the phosphoric acid esters and salts of phosphoric acid esters are preferably obtainable by reacting phosphoric acid with an aromatic diol compound, and/or wherein the phosphorus compound is selected from the group consisting of phosphoric acid-based compounds that comprise at least one phenol moiety, preferably at least two phenol moieties.

Herein, especially good results were achieved with lithium 2,2'-methylenebis(4,6-di-tert-butylphenyl)phosphate and aluminium hydroxybis[2,2'-methylen-bis(4,6-di-tert-butylphenyl)phosphate], wherein a particular large increase in average molecular weight was obtained for processes that employ the aluminum containing compound. Without wishing to be bound by theory, it is assumed that this could be due to the cation matching the cation of the polycondensation catalyst. Therefore, a process of the present invention is preferred, wherein the phosphorous compound comprises one or more compounds selected from the group consisting of lithium 2,2'-methylenebis(4,6-di-tert-butylphenyl)phosphate and aluminium hydroxybis[2,2'-methylen-bis(4,6-di-tert-butylphenyl)phosphate], and/or wherein the phosphorous compound comprises one or more compounds selected from the group consisting of aluminum salts of phosphoric acid esters.

As indicated above, the concentration ranges for the polycondensation catalyst and/or the phosphorous compound can be chosen by the skilled person for his specific process. However, the inventors identified optimized concentration ranges for the aluminum containing catalyst and the phosphorous compound that are especially suitable if the starting composition comprises 90% or more, preferably 95% or more, most preferably 98% or more, by weight of FDCA and aliphatic diol.

Therefore, preferred is a process according to the invention, wherein the concentration of the aluminum containing catalyst in step c), calculated as the metal per se, is in the range of 10 to 1000 ppm, preferably 15 to 500 ppm, more preferably 20 to 300 ppm, most preferably 25 to 150 ppm, even more preferably 30 to 50 by weight with respect to the theoretical maximum weight of the polymer obtainable from the respective starting composition, and/or wherein the amount of the aluminum containing catalyst in step c) is in the range of 0.005 to 0.1%, preferably 0.01 to 0.05%, more preferably 0.02 to 0.04%, by weight with respect to the weight of 2,5-furandicarboxylic acid in the starting composition, and/or wherein the molar ratio of the aluminum containing catalyst to FDCA in the starting composition is in the range of 0.0001 to 0.01, preferably 0.0002 to 0.001.

Furthermore, a process of the present invention is preferred, wherein the concentration of the phosphorous compound in step c) is in the range of 188 to 37600 ppm, preferably 282 to 18800 ppm, more preferably 376 to 11280 ppm, most preferably 470 to 5640 ppm, even more preferably 564 to 1880 ppm by weight with respect to the theoretical maximum weight of the polymer obtainable from the respective starting composition, wherein preferably the molar ratio of the phosphorous in the phosphorous compound to the aluminum in the aluminum containing catalyst is in the range of 0.5 to 5, preferably 1 to 3, more preferably 1.5 to 2.5 and/or wherein the molar ratio of the phosphorous in the phosphorous compound to FDCA in the starting composition is in the range of 0.0002 to 0.02, preferably 0.0004 to 0.002.

In the process of the present invention the skilled person is in principle free to add other polycondensation catalysts or other phosphorous compounds, although the exclusive use of aluminum compounds as polycondensation catalyst and of the specific phosphorous compounds as defined above is explicitly preferred.

Therefore, a process according to the invention is preferred, wherein the catalyst system consists of aluminum compounds and phosphorous compounds that are selected from the group consisting of phosphoric acid-based compounds that comprise an aromatic moiety, wherein preferably the concentration of each of titanium, magnesium zinc, calcium and antimony compounds in the starting composition is in the range of 0 to 100 ppm based on total amount of starting composition. The content of each of these metals preferably is less than 50 ppm, more preferably 0 to 20 ppm, more preferably less than 5 ppm by weight with respect of the weight of the starting composition.

Preferred is a process according to the invention, wherein the amount of ethers of aliphatic diol incorporated in the polyester comprising 2,5-furandicarboxylate units, after polycondensation is less than 3%, preferably less than 2.5%, by weight with respect to the weight of the polyester. The inventors identified that the amount of ethers of aliphatic diol that get incorporated in the polyester should be less than the values indicated above, in order to obtain especially beneficial physical-chemical properties of the resulting polyester.

The skilled person is well aware of a number of suitable methods for determining the end groups in polyesters, including titration, infrared and proton-nuclear magnetic resonance ($^1$H-NMR) methods. In many cases, separate methods are used to quantify the four main end groups, i.e. carboxylic acid end groups, hydroxyl end groups, ester end groups and the end groups that are obtained after decarboxylation.

A. T Jackson and D. F. Robertson have published an $^1$H-NMR method for end group determination in PET in "Molecular Characterization and Analysis of Polymers" (J. M. Chalmers en R. J. Meier (eds.), Vol. 53 of "Comprehensive Analytical Chemistry", by B. Barcelo (ed.), (2008) Elsevier, on pages 171-203. A similar method can be carried out for polyesters that comprise 2,5-furandicarboxylate units. Herein, the measurement of the end groups can be performed at room temperature without an undue risk of precipitation of the polyester from the solution. This $^1$H-NMR method using deuterated 1,1,2,2-tetrachloroethane (TCE-d2) is very suitable to determine the amount of decarboxylation end groups (DEC) and can also be used to determine the content of ethers of aliphatic diol incorporated in the polyester. Peak assignments are set using the TCE peak at a chemical shift of 6.04 ppm. The furan peak at a chemical shift of 7.28 ppm is integrated and the integral is set at 2.000 representing the two protons on the furan ring. The decarboxylated end groups are found at a chemical shift of 7.64-7.67 ppm, representing one proton. The content of DEG is determined from the integral of the respective shift of the protons adjacent to the ether functionality, e.g. shifts at 3.82 to 3.92 ppm for DEG, representing four protons. The amount of hydroxyl end groups (HEG) is determined from the two methylene protons of the hydroxyl end group at 4.0 ppm. In the framework of the present invention, the above described methods are used to determine DEC, the content of DEG and other ethers as well as HEG, while the amount of carboxylic acid end groups (CEG) is determined using titration as disclosed in the experimental section below.

Preferred is a process according to the invention, wherein the polyester comprising 2,5-furandicarboxylate units after polycondensation has a number average molecular weight of 20 kg/mol or more, preferably 25 kg/mol or more. The inventors found that with the process of the present invention, the polycondensation can reliably be conducted in a way that the above defined number average molecular weights are obtained, thereby yielding polyesters with interesting physical-chemical properties after polycondensation, that form a good basis for obtaining very high molecular weights during subsequent solid state polymerization.

While the polyester obtained after polycondensation can be used directly for specific applications, it is, as disclosed above, in several cases beneficial to add further processing steps. These steps can comprise a step of crystallizing the polyester for obtaining a crystallized polyester and subjecting the crystallized polyester to a solid-state polymerization for increasing the molecular weight.

Correspondingly, a process according to the invention is preferred, further comprising the steps:

d) crystallizing the polyester comprising 2,5-furandicarboxylate units obtained in step c) to obtain a crystallized or semi-crystallized polyester comprising 2,5-furandicarboxylate units, and e) subjecting the crystallized polyester comprising 2,5-furandicarboxylate units produced in step d) to a solid state polymerization for increasing the molecular weight.

Both steps are known to the skilled person from the TA/PET technology and the skilled person is typically able to adjust the process parameters of these steps according to his needs. However, the inventors identified specific process parameters that were found to be particularly beneficial for the process of the present invention, i.e. employing a specific polycondensation catalyst and a specific phosphorous compound, in particular if both of these compounds are still present in the crystallized polyester as will typically be the case.

Insofar, a process according to the invention is preferred, wherein the solid state polymerization is conducted at an elevated temperature in the range of Tm-80° C. to Tm-20° C., preferably Tm-60° C. to Tm-25° C., more preferably Tm-60° C. to Tm-30° C., wherein Tm is the melting point of the polyester comprising 2,5-furandicarboxylate units in ° C., wherein the solid state polymerization is preferably conducted at an elevated temperature in the range of 160 to 240° C., more preferably 170 to 220° C., most preferably 180 to 210° C., and/or wherein the crystallization is conducted at an elevated temperature in the range of 100 to 200° C., preferably 120 to 180° C., more preferably 140 to 160° C., and/or wherein the crystallization is conducted for a time tin the range of 0.5 to 48 h, preferably 1 to 6 h, wherein step d) is preferably conducted directly after step c) without cooling the polyester comprising 2,5-furandicarboxylate units below 50° C., and/or wherein the crystallization is conducted at or near ambient pressure or, less preferred, at reduced pressure of less than 100 kPa or less than 10 kPa, and/or wherein the solid state polymerization is conducted under inert gas atmosphere, preferably nitrogen, helium, neon or argon atmosphere.

It is preferred that the crystallized or semi-crystallized polyester obtained in step d) is granulated to obtain a degree of granulation in the range of 20 to 180 pellets per g, preferably 40 to 140 pellets per g.

The inventors found that the optimal time for the crystallization can be chosen based on the crystallization enthalpy dHcryst of the polyester. When the polyester obtained in step c) is heated to yield a semi-crystallized or crystallized polyester, the amount of decarboxylated end groups does not alter. However, the crystallinity changes significantly. This may be determined by means of Differential Scanning calorimetry (DSC). The crystallinity is often measured as the enthalpy for melting the semi-crystalline polymer when heating at a suitable rate. The crystallinity is expressed in the unit J/g, and is taken as the net enthalpy of the melting peak (endotherm) after correcting for any crystallization (exotherm) which occurs on the upheat. A process according to the invention is preferred, wherein the crystallization is conducted for a time t so that the net enthalpy dHcryst of the polyester comprising 2,5-furandicarboxylate is larger than 20 J/g, preferably larger than 25 J/g, more preferably larger than 30 J/g as measured via DSC using a heating rate of 10 d° C./min.

The effect of the solid-state polymerization is a significant increase in the number average and weight average molecular weight of the obtained polyester, wherein it is typically observed that the optical properties are adversely affected by the steps of crystallization and solid-state polymerization. Insofar it was observed that improved optical properties can be obtained after solid-state polymerization with the process of the present invention, in particular as the polyester obtained with the process of the present invention exhibits an increased polymerization rate during solid state polymerization, allowing for shorter solid state polymerization times, thereby reducing any potential detrimental effect of the solid state polymerization step.

Looking at the molecular weights after solid state polymerization, preferred is a process according to the invention, wherein the polyester comprising 2,5-furandicarboxylate units after solid state polymerization has a number average molecular weight of 45 kg/mol or more, preferably 50 kg/mol or more, and/or wherein the polyester comprising 2,5-furandicarboxylate units after solid state polymerization has a weight average molecular weight of 110 kg/mol or more, preferably 130 kg/mol or more, more preferably 140 kg/mol or more. Due to the beneficial properties of the polyester that is obtained in the process of the invention, that show a larger increase in average molecular weight during solid state polymerization, these values, that are very suitable for several high value applications, can be achieved in comparably short solid state polymerization times.

In the framework of the present invention, the weight average molecular weight and the number average molecular weight are determined as disclosed in the experimental section below.

In view of the above disclosure regarding the process of the present invention, it is apparent that the invention also relates to a catalyst system for use in a process according to the invention, comprising an aluminum compound as a polycondensation catalyst and a phosphorous compound, wherein the phosphorous compound comprises one or more compounds selected from the group consisting of phosphoric acid based compounds that comprise an aromatic moiety, wherein preferred embodiments of both compounds are defined above.

The invention furthermore relates to the use of such a catalyst system according to the invention in the production of a polyester comprising 2,5-furandicarboxylate units, preferably in a process according to the invention, for increasing the polymerization rate in average molecular weight gained per time during subsequent solid state polymerization of the polyester comprising 2,5-furandicarboxylate units.

The invention additionally relates to a polyester comprising 2,5-furandicarboxylate units, comprising an aluminum compound as a polycondensation catalyst and a phosphorous compound, wherein the phosphorous compound comprises one or more compounds selected from the group consisting of phosphoric acid based compounds that comprise an aromatic moiety, wherein preferred embodiments of both compounds are defined above.

Preferred is a polyester comprising 2,5-furandicarboxylate units according to the invention, comprising aluminum, calculated as the metal per se, in the range of 10 to 1000 ppm, preferably 15 to 500 ppm, more preferably 20 to 300 ppm, most preferably 25 to 150 ppm, even more preferably 30 to 50 by weight with respect to the weight of the polyester. The respective polyester was found to exhibit favorable properties and improved processability during a subsequent melt processing step compared to prior art polyesters, wherein in particular better optical properties are obtained after subsequent melt processing.

The polyester as obtained in the process of the present invention or the polyesters after solid state polymerization can advantageously be applied in the preparation of containers, fibres and/or films. Such containers include multilayer containers wherein the polyester according to the invention is contained in one layer and other layers are added to provide additional properties, e.g. strength. In view of the excellent barrier properties of the containers and films the polyester according to the invention is excellently suited for the preparation of containers and films, such as mono- or biaxially oriented films, for use in food packaging, including for use in so-called hot fill applications thereof.

It is known to provide toning (or bluing) compounds to combat yellowing of polyester articles (such as bottles, containers, films, fibers and the like). Such toning permits effective neutralization of yellowness due to a sharp absorption peak within a certain range of wavelengths. Toning compounds can also counteract the yellowing effects of other additives such as specific UV absorbers. It can be advantageous to combat yellowing of poly(ethylene-2,5-furandicarboxylate) containing compositions and articles by incorporating toning compounds known to be suitable for polyesters either per se or together with other additives to facilitate addition.

Hereinafter, the invention is described in more detail using experiments.

EXAMPLES

Abbreviations and Measurements

DEC denotes the equivalents of decarboxylated end groups per metric ton of the obtained polymer in mmol/kg (sometimes also given as eq/t), cDEG indicates the amount of diethylene glycol incorporated in the polyester in weight percent with respect to the weight of the polyester and HEG provides the equivalents of hydroxyl end groups per metric ton of the obtained polymer in mmol/kg. Herein, the values DEC, HEG and cDEG in the polyesters, were obtained by $^1$H-NMR as described above using TCE-d2 as a solvent. In a typical experiment about 10 mg of a polyester was weighed and put in an 8 ml glass vial. To the vial 0.7 ml of TCE-d2 was added and the polyester was dissolved at room temperature whilst agitating the mixture in the vial. The dissolved mixture was analyzed using $^1$H-NMR, whilst the peak for TCE-d2 was set to 6.04 ppm.

A_400 is the absorbance of 400 nm light measured as a 30 mg/mL solution in a dichloromethane:hexafluoroisopropanol 8:2 (vol/vol) mixture at 400 nm, in a 25 mm diameter tube, or with a measurement corrected to a 25 mm equivalent path length, respectively.

The amount of carboxylic end groups (CEG) in mmol/kg was measured by titration based on ASTM D7409, i.e. by titration of a solution of 0.4 to 1.2 g of the polymer sample dissolved in 50 mL of o-cresol with 0.01 M solution of potassium hydroxide in ethanol to its equivalence point using bromocresol green as indicator.

In the framework of the invention, the weight average molecular weight and the number average molecular weight are determined through the use of gel permeation chromatography (GPC). GPC measurement was performed at 35° C. using two PSS PFG linear M (7 μm, 8×300 mm) columns with precolumn. Hexafluorisopropanol with 0.05 M potassiumtrifluoroacetate was used as eluent. Flow rate was set to 1.0 mL/min, injection volume was 50 μL and the run time was 50 min. The calibration is performed using polymethylmethacrylate standards. PDI denotes the polydispersity index (or dispersity) that is known to the skilled person and obtainable from the weight average and number average molecular weight.

In the experiments, concentrations in ppm are given with respect to the theoretical maximum weight of the polymer obtainable from the respective starting composition, that is calculated by multiplying the mols of FDCA in the starting composition with the molecular weight of the corresponding theoretical polymer repeat unit (i.e. FDCA+aliphatic diol−2*$H_2O$).

The FDCA used in the experiments comprises less than 500 ppm FCA.

Experiments:

20 g of 2,5-furandicarboxylic acid were mixed with ethylene glycol in the molar ratio indicated below. The composition was subjected to a temperature of 220° C. for 210 min. After esterification, 9.5 mg of solid aluminum acetylacetonate was added as a polycondensation catalyst corresponding to a concentration of 34 ppm (Al based on theoretical polymer). Furthermore, after esterification specific phosphorous compounds were added either as a solid or a solution in ethylene glycol, as summarized in Table 1. Polycondensation was conducted for 75 min at 260° C. The results obtained for the polymers after melt polymerization, i.e. after polycondensation, are listed in Table 2.

TABLE 1

| | Molar ratio ethylene glycol to FDCA | Type of phosphorous compound | Concentration of phosphorous compound (ppm) |
|---|---|---|---|
| Ex1 | 1.18 | Aluminium hydroxybis [2,2'-methylenebis (4,6-di-tert-butylphenyl) phosphate] | 1264 (solid) |
| Ex2 | 1.18 | Aluminium hydroxybis [2,2'-methylenebis (4,6-di-tert-butylphenyl) phosphate] | 1264 (solid) |
| Ex3 | 1.18 | Lithium 2,2'-methylenebis (4,6-di-tert-butylphenyl) phosphate | 1230 (solid) |
| Ex4 | 1.18 | Lithium 2,2'-methylenebis (4,6-di-tert-butylphenyl) phosphate | 1230 (solid) |
| Comp1 | 1.15 | — | 0 |
| Comp2 | 1.15 | diethyl[[3,5-bis(1,1-dimethylethyl)-4-hydroxyphenyl] methyl]phosphonate | 889 (solution) |
| Comp3 | 1.18 | diethyl[[3,5-bis(1,1-dimethylethyl)-4-hydroxyphenyl] methyl]phosphonate | 889 (solid) |

TABLE 2

| # | DEC | CEG | HEG | cDEG | A_400/ (a.u.) | $M_n$/ (kg/mol) | $M_w$/ (kg/mol) | PDI |
|---|---|---|---|---|---|---|---|---|
| Ex1 | 4 | 60 | 58 | 1.9 | 0.009 | 28.8 | 65.8 | 2.3 |
| Ex2 | 4 | 40 | 86 | 2.0 | 0.013 | 27.9 | 63.6 | 2.3 |
| Ex3 | 3 | 43 | 80 | 1.9 | 0.013 | 28.2 | 61.8 | 2.2 |
| Ex4 | 4 | 35 | 90 | 1.9 | 0.014 | 27.5 | 59.9 | 2.2 |
| Comp1 | 4 | 67 | 111 | 1.9 | 0.008 | 23.1 | 47.4 | 2.1 |
| Comp2 | 4 | 41 | 88 | 1.9 | 0.009 | 28.7 | 62.6 | 2.2 |
| Comp3 | 5 | 38 | 114 | 1.9 | 0.007 | 24.6 | 52.5 | 2.1 |

The Experiments Ex1, Ex2, E3 and Ex4 are conducted according to the present invention and employ an aluminum containing catalyst and a phosphorous compound, wherein the phosphorous compound comprises a compound selected from the group consisting of phosphoric acid based compounds that comprise an aromatic moiety.

Comparative Experiments Comp1 to Comp3 employ an aluminum containing catalyst but do not use a phosphorous compound that is selected from the group consisting of phosphoric acid-based compounds that comprise an aromatic moiety. In fact, Comp2 and Comp3 use a phosphonate as preferred in EP3085723 A1.

It can be seen, that similar optical properties can be achieved with the process of the present invention wherein on average an increase in both number average and weight average molecular weight can already be observed after polycondensation.

The resins obtained after polycondensation as described above where crystallized at atmospheric pressure under air at a temperature of 150° C. before being subjected to solid state polymerization for 24 h under nitrogen atmosphere at a temperature of 200° C. The average diameter of the particles subjected to solid state polymerization was 1.4 to 2.0 mm. The results are summarized in Table 3, wherein Delta $M_n$, Delta $M_w$ and DeltaA_400 denote the change in molecular weight and optical properties caused by solid state polymerization compared to the polyester after polycondensation.

TABLE 3

| # | $M_n$/ (kg/mol) | $M_w$/ (kg/mol) | Delta $M_n$/ (kg/mol) | Delta $M_w$/ (kg/mol) | PDI | DeltaA_400/ (a.u.) |
|---|---|---|---|---|---|---|
| Ex1 | 45.7 | 118.2 | 16.9 | 52.4 | 2.6 | |
| Ex2 | 56.4 | 148.1 | 28.5 | 84.6 | 2.6 | 0.037 |
| Ex3 | 58.3 | 140.0 | 30.1 | 78.2 | 2.4 | 0.027 |
| Ex4 | 52.5 | 136.4 | 25.0 | 76.5 | 2.6 | 0.026 |
| Comp1 | 41.5 | 91.1 | 18.4 | 43.7 | 2.2 | 0.015 |
| Comp2 | 46.6 | 109.2 | 17.9 | 46.6 | 2.3 | 0.016 |
| Comp3 | 43.8 | 97.5 | 19.2 | 45.0 | 2.2 | 0.017 |

The data show that on average much higher molecular weights can be obtained with the process of the present invention compared to the comparative examples. The most prominent effect is that on average a larger increase in Delta $M_n$ and Delta $M_w$ is observed for the process of the present invention, wherein in particular the increase in Delta $M_w$ is larger for the polyesters obtained with the process of the present invention.

Therefore, the experiments show that with the process of the present invention a polyester comprising 2,5-furandicarboxylate units can be obtained having good average molecular weight after polycondensation and a high polymerization rate (in average molecular weight, in particular weight average molecular weight, gained per time) during subsequent solid state polymerization.

The invention claimed is:

1. A process for producing a polyester comprising 2,5-furandicarboxylate units, which process comprises:

a) providing or producing a starting composition comprising 2,5-furandicarboxylic acid or a diester thereof and an aliphatic diol, b) subjecting the starting composition to esterification conditions to produce an ester composition, and c) contacting the ester composition with an aluminum containing catalyst and a phosphorous compound at polycondensation conditions to produce a polyester comprising 2,5-furandicarboxylate units, wherein the phosphorous compound is selected from the group consisting of salts of phosphoric acid esters that comprise at least two phenol moieties.

2. The process according to claim 1, wherein the starting composition comprises 2,5-furandicarboxylic acid and the aliphatic diol comprises 2 to 8 carbon atoms.

3. The process according to claim 1, wherein the molar ratio of the aliphatic diol to 2,5-furandicarboxylic acid of the starting composition is in the range of 1.01 to 1.80.

4. The process according to claim 1, wherein the esterification conditions comprise a temperature in the range of 180 to 260° C., and/or wherein the polycondensation conditions comprise a temperature in the range of 240 to 300° C.

5. The process according to claim 1, wherein the aluminum containing catalyst is selected from the group consisting of aluminum formate, aluminum acetate, aluminum subacetate, aluminum propionate, aluminum oxalate, aluminum chloride, and aluminum hydroxychloride, aluminum hydroxide, aluminum methoxide, aluminum ethoxide, aluminum propoxide, aluminum isopropoxide, aluminum n-butoxide, aluminum tert-butoxide, aluminum acetylacetonate, aluminum acetylacetate, trimethylaluminum, triethylaluminum, partial hydrolysates of any of the compounds, aluminum oxide and combinations thereof.

6. The process according to claim 1, wherein the starting composition is subjected to esterification conditions in the absence of the aluminum containing catalyst and/or the phosphorous compound.

7. The process according to claim 1, further comprising the steps:

d) crystallizing the polyester comprising 2,5-furandicarboxylate units obtained in step c) to obtain a crystallized polyester comprising 2,5-furandicarboxylate units, and e) subjecting the crystallized polyester comprising 2,5-furandicarboxylate units produced in step d) to a solid state polymerization for increasing the molecular weight.

8. The process according to claim 7, wherein the solid state polymerization is conducted at an elevated temperature in the range of Tm-80° C. to Tm-20° C., wherein Tm is the melting point of the polyester comprising 2,5-furandicarboxylate units in ° C.

9. The process according to claim 1, wherein the concentration of the aluminum containing catalyst in step c), calculated as the metal per se, is in the range of 20 to 300 ppm by weight with respect to the theoretical maximum weight of the polymer obtainable from the respective starting composition.

10. The process according to claim 1, wherein the concentration of the phosphorous compound in step c) is in the range of 470 to 5640 ppm by weight with respect to the theoretical maximum weight of the polymer obtainable from the respective starting composition.

* * * * *